(12) United States Patent
Lebon et al.

(10) Patent No.: US 12,092,074 B2
(45) Date of Patent: Sep. 17, 2024

(54) SYSTEM FOR ERECTING A TOWER AND CORRESPONDING METHOD

(71) Applicant: SOLETANCHE FREYSSINET, Rueil-Malmaison (FR)

(72) Inventors: Jean-Daniel Lebon, Saint-Germain-en-Laye (FR); Eric Laurent, Boissy-Sous-Saint-Yvon (FR)

(73) Assignee: SOLETANCHE FREYSSINET, Rueil-Malmaison (FR)

( * ) Notice: Subject to any disclaimer, the term of this patent is extended or adjusted under 35 U.S.C. 154(b) by 111 days.

(21) Appl. No.: 17/829,676

(22) Filed: Jun. 1, 2022

(65) Prior Publication Data
US 2022/0389909 A1 Dec. 8, 2022

(30) Foreign Application Priority Data
Jun. 2, 2021 (EP) .................................. 21305739

(51) Int. Cl.
*F03D 13/10* (2016.01)
*F03D 13/20* (2016.01)

(52) U.S. Cl.
CPC ............. *F03D 13/10* (2016.05); *F03D 13/20* (2016.05); *F05B 2240/912* (2013.01)

(58) Field of Classification Search
CPC ..... E04H 12/342; E04H 12/344; F03D 13/10; Y02E 10/72; F05B 2240/912
See application file for complete search history.

(56) References Cited

U.S. PATENT DOCUMENTS

| | | | | |
|---|---|---|---|---|
| 10,287,794 B2* | 5/2019 | Neighbours | .......... | E04H 12/342 |
| 10,364,800 B2* | 7/2019 | Joss | .................... | F03D 13/10 |
| 10,577,820 B2* | 3/2020 | García Perez | ........ | E04H 12/344 |
| 2010/0281818 A1 | 11/2010 | Southworth | | |
| 2022/0389909 A1* | 12/2022 | Lebon | ................... | E04H 12/344 |
| 2023/0211981 A1* | 7/2023 | Himmelhan | ............ | B66B 19/00 |
| | | | | 52/745.18 |

FOREIGN PATENT DOCUMENTS

| | | |
|---|---|---|
| EP | 2852724 B1 | 7/2017 |
| EP | 3146131 B1 | 12/2018 |
| EP | 2475883 B1 | 6/2019 |
| WO | 2015/120537 A1 | 8/2015 |

OTHER PUBLICATIONS

European Search Report (ESR) for EP 21305739 completed Oct. 15, 2021 (3 pages).

* cited by examiner

*Primary Examiner* — Andrew J Triggs
(74) *Attorney, Agent, or Firm* — Shumaker, Loop & Kendrick, LLP

(57) ABSTRACT

A system for assembling a tower for a wind generator having a succession of subsections (Si). The system including: a plurality of lifting legs, a lifting structure vertically movable on the lifting legs, the lifting structure including a rigid lifting frame for holding the tower under assembly, the lifting frame including load transfer members and the lifting structure including self-climbing mechanisms interacting between the load transfer members and the lifting legs for elevating or lowering the lifting structure, and at least a first set of gripping arms movable relative to the lifting frame between a retracted configuration and a gripping configuration.

17 Claims, 10 Drawing Sheets

SYSTEM FOR ERECTING A TOWER AND CORRESPONDING METHOD

TECHNICAL FIELD AND BACKGROUND

The present invention relates to a system for erecting a tower.

EP3146131B1 in the name of applicant discloses a system for assembling a tower for a wind generator made of a succession of subsections, this system comprising:
  A lifting structure for lifting the tower under assembly, comprising retractable arms configured for engaging windows of the subsections,
  a supporting structure for elevating said lifting structure to enable to place a next subsection under the tower under assembly.

The supporting structure and the lifting structure may be assimilated to two telescopic cages, with the sliding of the lifting structure being stabilized by guiding elements interacting at various heights between the lifting structure and the supporting structure.

The elevation of the lifting structure is carried out using cables and pulleys resting on top of the supporting structure. The latter is dimensioned to absorb the bending moments caused by the guiding elements. The supporting structure is quite cumbersome and relatively complex to assemble or disassemble.

The lifting structure comprises holding arms that bear against the tower to help maintain the latter vertical within the lifting structure and is also relatively complex to build and operate.

SUMMARY

The present invention aims at improving further the system disclosed in EP3146131B1 and exemplary embodiments of the invention relate to a system for assembling a tower for a wind generator comprising a succession of subsections, the system comprising:
  A plurality of lifting legs,
  a lifting structure vertically movable on the lifting legs, said lifting structure comprising a rigid lifting frame for holding the tower under assembly, said lifting frame comprising load transfer members and said lifting structure comprising self-climbing mechanisms interacting between the load transfer members and the lifting legs for elevating or lowering the lifting structure,
  at least a first set of gripping arms movable relative to the lifting frame between a retracted configuration and a gripping configuration.

Thanks to the presence of the self-climbing mechanisms the supporting structure may be simplified.

Furthermore, because the frame of the lifting structure is rigid, there is no longer a need for guiding elements operating at various heights of the lifting structure and the latter may only interact with the lifting legs through the load transfer members.

The application of ovalization forces to the concrete material of the subsection may also be avoided, thus reducing the risk of damaging it.

Lifting Structure
Rigid Frame

The frame of the lifting structure preferably comprises a plurality of braced frame structures distributed around a central axis of the lifting frame and each associated with a respective lifting leg, the braced frame structures being interconnected by top and bottom interconnecting structures, each interconnecting structure preferably being substantially ring shaped. This provides rigidity to the frame.

Each braced frame structure preferably comprises at least one oblique beam extending obliquely with a distance to a central axis of the frame increasing going downwards from the top interconnecting structure to a corresponding load transfer member. Accordingly, some of the strain applied to the load transfer members can be transferred to the top interconnecting structure which helps to limit deformation of the frame under operation.

Each braced frame structure preferably comprises at least one vertical beam extending between said top and bottom interconnecting structures, and preferably at least one horizontal beam extending from the lower interconnecting structure to a vertical connecting member, said vertical connecting member extending vertically from the junction of the oblique beam with the load transfer member.

Each braced frame structure preferably comprises a diagonal brace extending from the load transfer member to the bottom interconnecting structure.

Each braced frame structure is preferably symmetrical about a mid-plane of symmetry containing the longitudinal axis of the adjacent lifting leg.

Each braced frame structure preferably comprises two oblique beams extending obliquely with a distance to a central axis of the frame increasing going downwards from a top interconnecting structure to a load transfer member extending at least partially close to an adjacent lifting leg, two vertical beams extending between said top and bottom interconnecting structures, two horizontal beams extending from the lower interconnecting structure to a vertical connecting member, said vertical connecting member extending vertically from the junction of the adjacent oblique beam and load transfer member, and at least one brace member connecting the two vertical beams and/or the two oblique beams, each braced frame structure preferably comprising a horizontal brace connecting the two vertical beams.

All the beams may be made of steel and soldered so that the frame is monolithic and needs not be assembled on site. In a variant, the frame is made of at least two parts that are to be assembled on site, with the assembly being performed with bolts, shear pins and possibly welding.

Self-Climbing Mechanisms

The self-climbing mechanisms for elevating or lowering the lifting frame relative to the lifting legs may each comprise a first stage and a second stage connected by at least one expendable structure.

The expendable structure may comprise at least one jack, such as a hydraulic jack.

The first and second stages may be provided with releasable latches for selectively anchoring on the lifting leg. Each latch may comprise a pin and an actuator for moving the pin into and out of engagement with a corresponding hole of a climbing rail of the lifting leg. There are preferably two such pins per self-climbing mechanism, to engage holes in two diametrically opposed rails. The actuation of the pins is preferably automated and synchronized with the displacement of the stages.

One of said stages is preferably rigidly connected to the load transfer member. The self-climbing mechanism is preferably situated below the load transfer member to push the latter during lifting of the tower under assembly.

Gripping Arms

Each arm of the first set of gripping arms may be articulated between a working position where the arm is substantially horizontal and bears radially against the bottom interconnecting structure and a retracted position.

Each arm may be articulated close to its gripping end to a sustaining strut extending diagonally when the arm is in the working position between said arm and a fixed guiding element.

The strut may comprise a slide and said fixed guiding element engages said slide so that when the arm is in the working position the guiding element is bearing against a stop of said slide to take the strain of the strut, said slide moving relative to the guiding element when the arm is moved toward its retracted position to allow the pivotal of said arm.

The arm may be articulated at its proximal end to a support mounted on a slide allowing to move the proximal end of the arm radially outwards once the arm has been raised.

Preferably, the system comprises a second set of gripping arms different from the first set and configured for holding a subsection of the tower having an external diameter larger than the external diameter of the subsection the first gripping arms are capable of gripping.

The arms of the second set may be movable radially in a sliding manner between a gripping position and a retracted position.

The second set of gripping arms is preferably situated below the first set of gripping arms.

Load Transfer Members

Each load transfer member may be substantially U-shaped, with the branches of the U extending on either side of the lifting leg.

Preferably the load transfer members each comprise at least one adjustable guide configured to engage a climbing rail of the corresponding lifting leg to transfer to the lifting leg horizontal loads due to the pressure of the wind on the tower.

Monodirectional Bearings

The system may comprise monodirectional sliding bearings at windows of the subsection of the tower under assembly in which the gripping arms are engaged.

This reduces the risk of ovalization of the concrete segments.

The system may comprise in each window a mechanism such as a flat jack for adjusting the distance between the arm and the upper face of the window.

Method for Erection of a Tower for a Wind Generator

Exemplary embodiments of the invention also relate to a method for erecting a tower for a wind generator, comprising elevating the subsection(s) of the tower under assembly with a system, preferably as defined above, comprising:

A plurality of lifting legs,
a lifting structure vertically movable on the lifting legs, said lifting structure comprising a rigid lifting frame for holding the tower under assembly, said lifting frame comprising load transfer members and said lifting structure preferably comprising self-climbing mechanisms interacting between the load transfer members and the lifting legs for elevating or lowering the lifting structure,
at least a first set of gripping arms movable relative to the lifting frame between a retracted configuration and a gripping configuration and configured for engaging a subsection of the tower,
in which method the transfer of horizontal loads from the lifting structure or the tower to the lifting legs occurs only through the load transfer members.

In Other Words

Exemplary embodiments of the invention also relate to a method for erecting a tower for a wind generator, comprising elevating the subsection(s) of the tower under assembly with a system, preferably as defined above, comprising:

A plurality of lifting legs,
a lifting structure vertically movable on the lifting legs, said lifting structure comprising a rigid lifting frame for holding the tower under assembly, said lifting frame comprising load transfer members to which lifting forces are applied for raising the lifting structure and said lifting structure comprising self-climbing mechanisms interacting between the load transfer members and the lifting legs for elevating or lowering the lifting structure,
at least a first set of gripping arms movable relative to the lifting frame between a retracted configuration and a gripping configuration and configured for engaging a subsection of the tower,
in which method:
the lower end of the tower under assembly is elevated using the self-climbing mechanisms at a height sufficient for inserting below the tower under assembly a next subsection to be assembled with the raised subsection(s) of the tower,
the lifting structure is lowered so that the lower end of the tower under assembly can be assembled to this subsection,
the griping arms are disengaged from the tower under assembly,
the lifting structure is lowered to enable the griping arms to engage the subsection situated at the bottom of the tower under assembly.

This sequence may be reiterated until completion of the tower.

The tower may have a height exceeding 100 m, ranging for example between 120 and 200 m. A height of a subsection may range from 10 to 20 m.

Further Considerations

Exemplary embodiments of the invention also relate, independently or in combination with the above, to a system for assembling a tower for a wind generator comprising a succession of subsections, the system comprising:

A plurality of lifting legs,
a lifting structure vertically movable on the lifting legs, said lifting structure comprising a lifting frame for holding the tower under assembly,
at least a first set of gripping arms movable relative to the lifting frame between a retracted configuration and a gripping configuration and configured for engaging a subsection of the tower,
at least a second set of gripping arms movable relative to the lifting frame between a retracted configuration and a gripping configuration and configured for engaging a subsection of the tower of a larger diameter than the arms of the first set.

Exemplary embodiments of the invention also relate, independently or in combination with the above, to a system for assembling a tower for a wind generator comprising a succession of subsections, the system comprising:

A plurality of lifting legs,
a lifting structure vertically movable on the lifting legs, said lifting structure comprising a lifting frame for holding the tower under assembly, said lifting structure comprising braced frame structures interconnected by top and bottom interconnecting structures, preferably braced frame structures being symmetrical about a mid-plane of symmetry containing the longitudinal axis of the adjacent lifting leg, preferably braced frame structures comprising at least one oblique beam extending obliquely with a distance to a central axis of the frame that increases going downward, this oblique beam preferably connecting the top interconnecting structure to a load transfer member, at least a first set of gripping arms movable relative to the lifting frame between a retracted configuration and a gripping configuration and configured for engaging a subsection of the tower.

These systems may exhibit all or part of the other features of the system defined above. For example, it may or may not be provided with self-climbing mechanisms such as the ones defined above.

DETAILED DESCRIPTION

Figure 1:
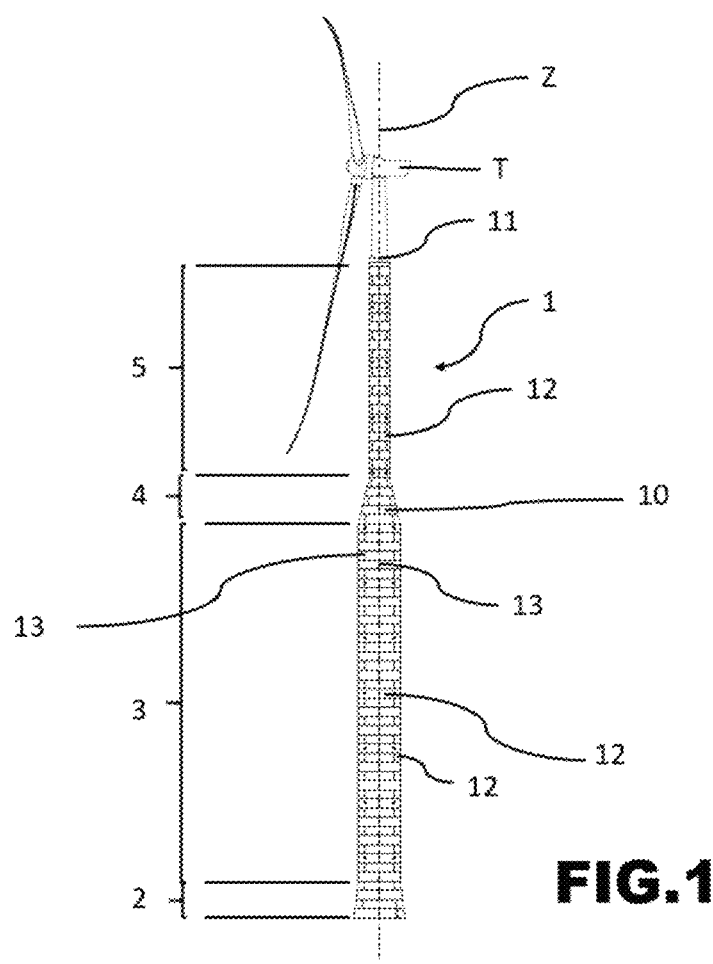
FIG. 1 is a schematic view in elevation of a tower erected using a system in accordance with the invention.

FIG. 1 shows an example of a wind turbine tower 1 that may be erected in accordance with the invention.

The tower 1 comprises a plurality of segments 10 that are assembled vertically along the longitudinal axis Z of the tower.

The wind turbine T is affixed on top the tower 1 thanks to an end ring element 11.

Each segment 10 is ring shaped and composed of sectors 12, that are preferably arc-shaped, as shown, and made of precast concrete.

The tower 1 may comprise:

A first frustoconical section 2 with an enlarged base of external diameter D, this first frustoconical section being made of a plurality of annular segments axially aligned with each other along the longitudinal axis Z of the tower, a second cylindrical 3 section of constant diameter C, this second section being made of a plurality of annular segments axially aligned with each other, the lower end of such second section resting on the upper end of the first frustoconical section 2, a third frustoconical section 4 having an enlarged base resting on top of the second section 3, this third section being made of a plurality of annular segments axially aligned with each other, a fourth cylindrical section 5 resting on top of the third section 4, of a diameter B smaller than the diameter C of the second section 3, this fourth section 5 being made of a plurality of annular segments axially aligned with each other.

Figure 2:
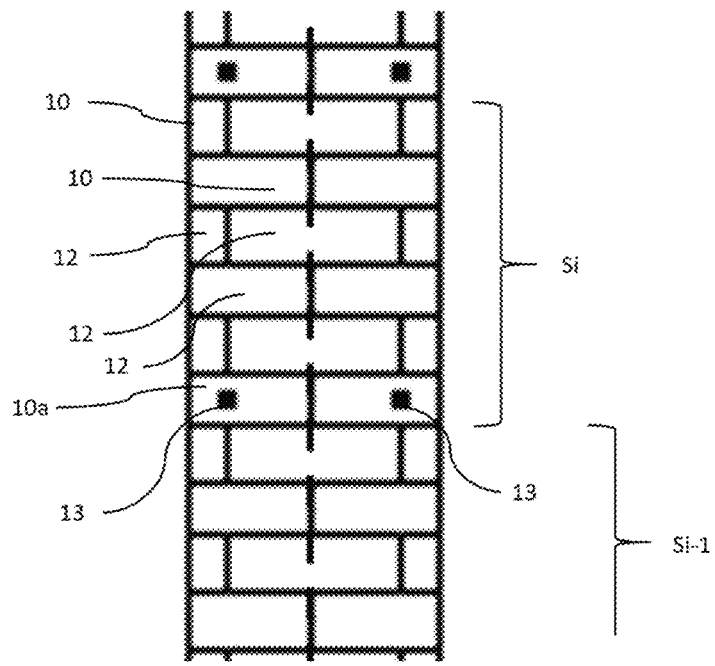
FIG. 2 shows a detail of FIG. 1.

As shown more particularly in FIG. 2, the tower is erected using subsections Si that are each assembled at ground level and then placed under previously installed subsections.

Each subsection Si may be formed of a same number of annular segments 10, e.g. 6 segments, as shown.

All subsections Si except the bottom one are provided with a bottom segment 10a whose sectors 12 may comprise a window 13. In the example shown, there are four windows 13 per subsection Si.

Figure 3:
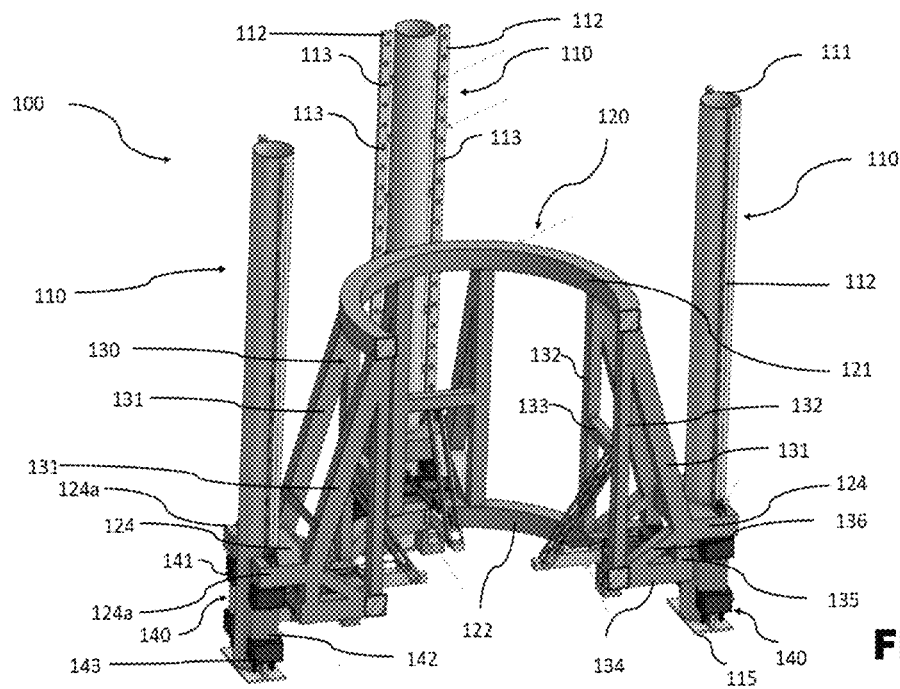
FIG. 3 is a partial and schematic perspective view of an embodiment of a system according to the invention, FIGS. 4A, 4B, and 4C each illustrate the operation of the self-climbing mechanisms.

FIG. 3 shows a system 100 according to the invention that may be used for erecting the tower 1.

This system 100 comprises as many lifting legs 110 as there are windows per subsection Si, i.e. four in this example. However, the number of lifting legs may be different and be 3 or more than 4.

Each lifting leg 110 comprises a vertical pillar 111 resting at its bottom end on a plate 115 and two diametrically opposite climbing rails 112 extending vertically along the legs 110. These rails 112 are each provided with a series of equidistant holes 113. The pillars 111 may be made from steel pipes having a circular cross section, as shown.

Figure 11:
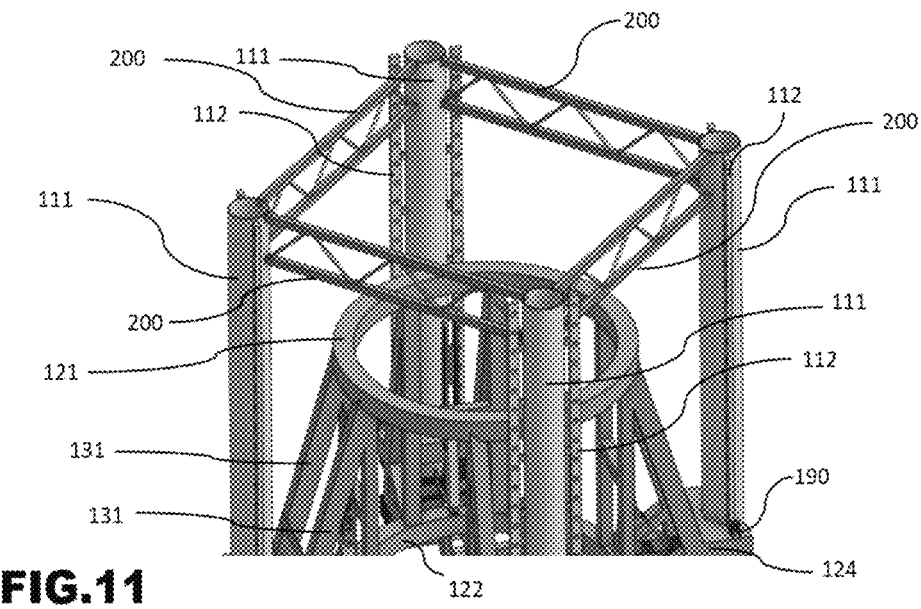
FIG. 11 is a partial perspective view of a variant embodiment of the system.

In the example of FIG. 3 the lifting legs 110 have independent upper ends but in a variant, as shown in FIG. 11, they may be connected by bracings 200 extending in a square configuration with pillars 111 located at the apexes of the square.

The system 100 comprises a lifting structure 120 that is movable along the lifting legs 110. This lifting structure 120 comprises a rigid lifting frame comprising four braced frame structures 130 each associated with a respective lifting leg 110, these structures 130 being interconnected at their upper end by a top interconnecting structure 121 and near their bottom end by a bottom interconnecting structure 122. These interconnecting structures 121 and 122 are constituted in the example shown by ring-shaped beams, the diameter of the top interconnecting structure 121 being substantially the same as the diameter of the bottom interconnecting structure 122, both being centered about the vertical central axis of the lifting structure 120.

The lifting frame comprises U-shaped load transfer members 124 extending radially away from each braced frame structure 130, with two branches 124a extending on either side of a corresponding pillar 111.

Self-climbing mechanisms 140 are provided under each load transfer member 124 to interact with the lifting legs 110 to move the lifting frame vertically.

Each self-climbing mechanism 140 comprises an upper stage 141 that is connected to the load transfer member 124, a lower stage 143 and an expandable structure 142 that comprises for example one or more hydraulic jacks.

Figure 13:
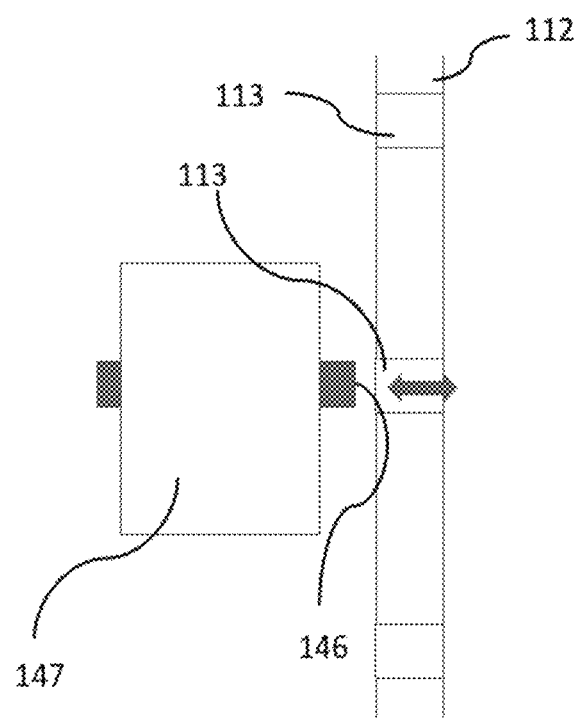
FIG. 13 is a schematic view of a latch mechanism for immobilizing a stage of a self-climbing mechanism relative to the leg.

Each stage 141 and 142 comprises a releasable latch comprising a pin 146 configured to engage the holes 113 of the climbing rails to immobilize the mechanism at a selected position on the leg 110, as illustrated in FIG. 13.

Each latch comprises for example an actuator 147 to move the pin 146 in or out of engagement of a corresponding hole 113.

The actuation of the pins 146 can be automated and synchronized with the displacement of the stages 141 and 142.

Figure 4A:
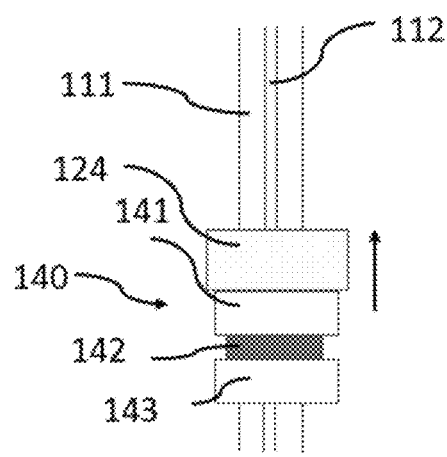
Figure 4B:
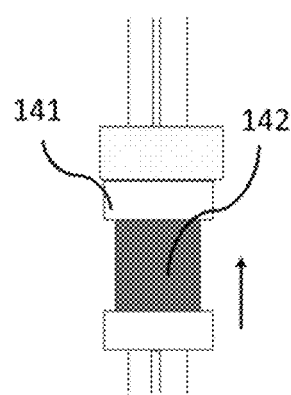
Figure 4C:
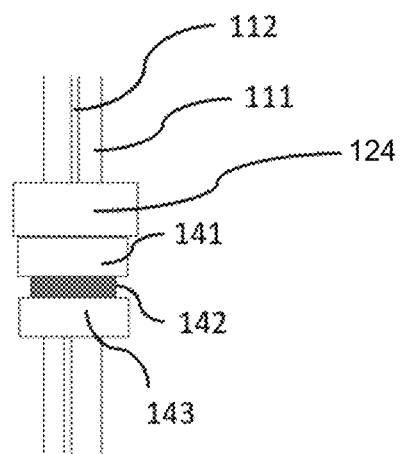

The self-climbing mechanisms 140 may operate according to the sequence shown in FIGS. 4A to 4C to elevate the lifting frame.

First, the lower stage 143 is locked on the rails 112, and the upper stage 141 unlocked. Then, the expendable structure 142 is actuated and pushes the upper stage 141 upwards, together with the load transfer member 124 attached thereto. Once the upper stage 141 has reached its next position, as shown in FIG. 4B, its latch is activated to immobilize the upper stage 141 relative to the rails 112. The load can now be supported by this stage 141 and the latch of the lower stage 143 can be retracted. Then, the expandable structure 142 can be retracted to raise the lower stage to its next position, as shown in FIG. 4C. This sequence is repeated as many times as necessary to raise the lifting frame of the desired height along the legs 110.

For lowering the lifting frame, an inverse sequence is carried out.

Each braced frame structure 130 comprises two vertical beams 132 extending upright from the top interconnecting structure 121 down to the bottom interconnecting structure 122. These vertical beams 132 are connected by a horizontal brace 133 at substantially their mid-height.

Each braced frame structure 130 comprises two oblique beams 131 extending obliquely with a distance to the adjacent vertical beam 132 that increases going downward.

These oblique beams 131 connect at their lower end to the load transfer member 124.

Horizontal beams 134 extend from the bottom interconnecting structure 122 to a location close to the adjacent leg 110, where they are attached to the load transfer member thanks to a vertical connecting member 135.

A diagonal brace 136 extends substantially from the junction of the oblique beam 131 with the load transfer member 124 to the junction of the vertical beam 132 with the horizontal beam 134.

Each braced frame member 130 is symmetrical about a mid-plane of symmetry that is passing through the longitudinal vertical axis of the adjacent leg 110.

The lifting structure 120 carries a first set of four gripping arms 150 that are configured for gripping subsections of the smaller diameter, and a second set of gripping arms 170 that are configured for gripping subsections of the tower of a larger diameter.

Figure 9:
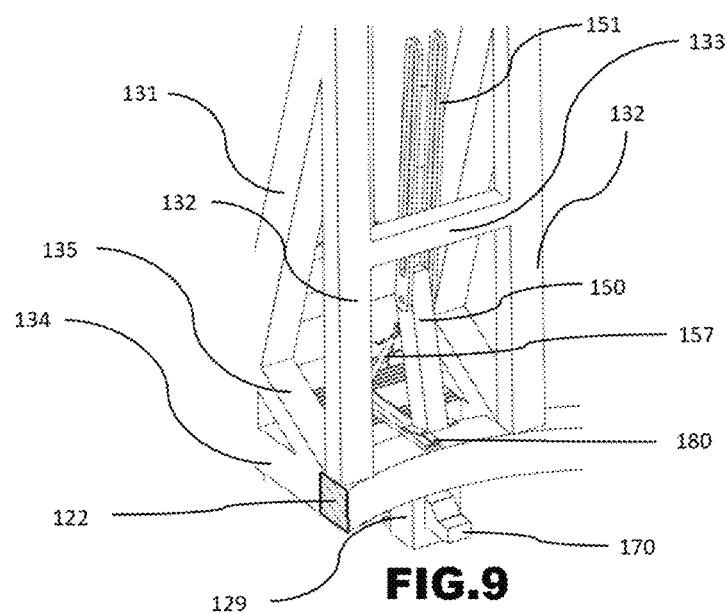
FIG. 9 illustrates the deployment of an arm for large diameter subsections.

Each arm 150 is configured to take either a working configuration shown in FIG. 3, where it extends horizontally and radially substantially at the level of the bottom interconnecting structure 122, and a retracted configuration shown in FIG. 9 where it extends entirely outside an internal cylindrical volume having for diameter the inner diameter of the top interconnecting structure 121.

Each frame braced structure 130 carries a horizontal slide 180 in which a support carrying an articulation connected to a bracket 158 can move axially under the effect of an actuator 159 such as a hydraulic jack. The bracket 158 is rigidly connected to the arm 150.

Figure 5:
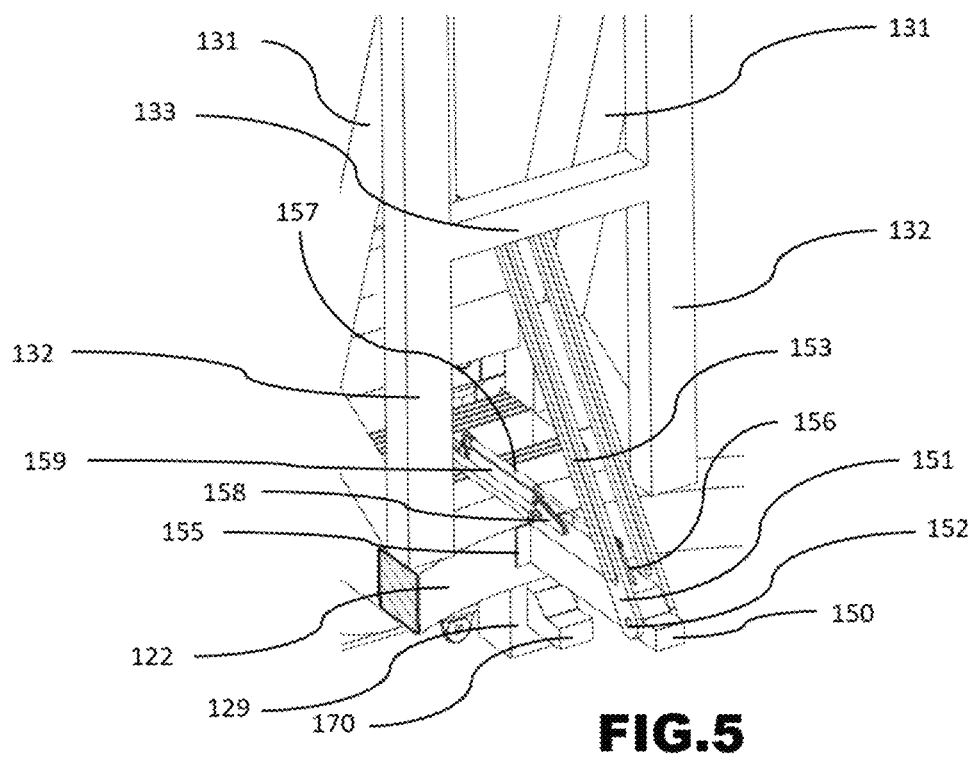
FIG. 5 illustrates the deployment of a griping arm for small diameter subsections.

A sustaining strut 151 having two parts each extending on a respective side of the arm 150 is articulated at 152 near the distal end of the arm 150, as shown in FIG. 5, and comprises a slide 153.

Figure 6:
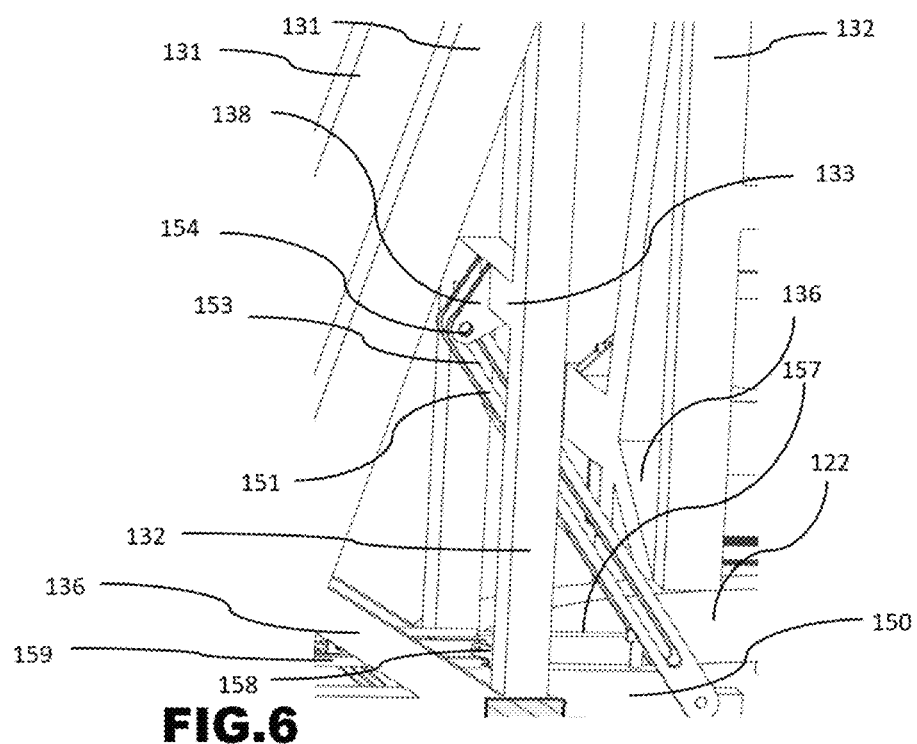
FIG. 6 shows the arm from a different point of observation.

A support 138 is fixed to the horizontal brace 133, as shown in FIG. 6, and carries a guiding element such as an axle 154 that is engaged in the slide 153.

An actuator 157 such as a hydraulic jack extends between a fixed point of the braced frame structure 130 and a bracket 156 fixed to the arm 150, as shown in FIG. 5.

Figure 7:
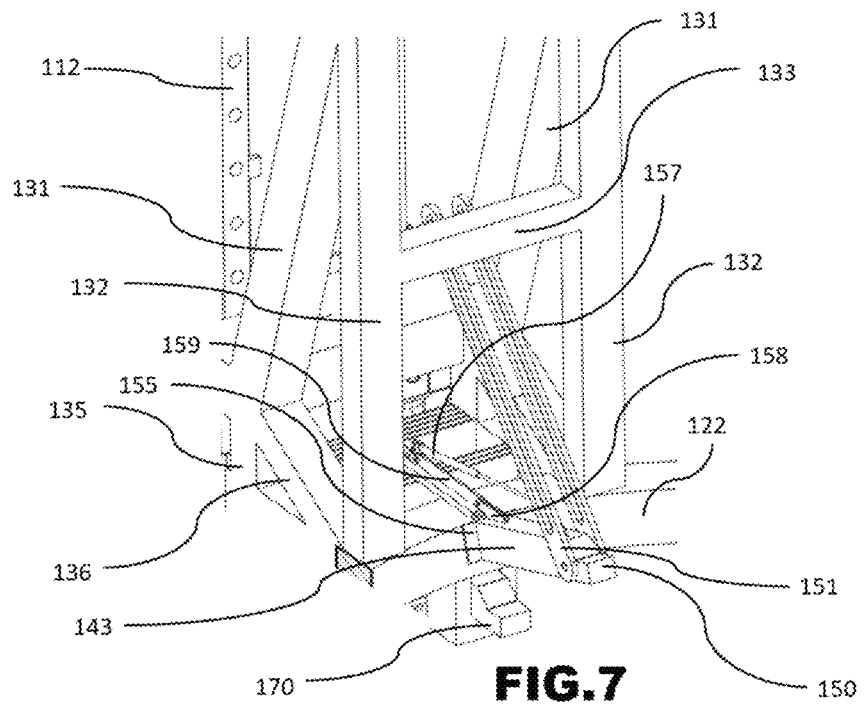
FIG. 7 shows the griping arm of FIG. 5 while being retracted.

The proximal end of the arm 150 is provided with a pad 155, as shown in FIG. 7.

When the arm 150 is in the working configuration, this pad 155 bears against the inner side of the bottom interconnecting structure 122, as shown in FIG. 5. This contributes to a precision positioning of the arm 150 relative to the lifting frame.

In this configuration, the axle 154 bears against the stop formed at the end of the slide 153 by the strut 151, and the latter can withstand the mechanical loads exerted by the weight of the tower on the arm 150.

For retracting the arm 150, the actuator 157 is retracted, which causes the arm 150 to pivot, as shown in FIG. 7.

During the pivotal of the arm 150, the axle 154 can move in the slide 153 and the axle guides the movement of the strut 151 upwards.

Figure 8:
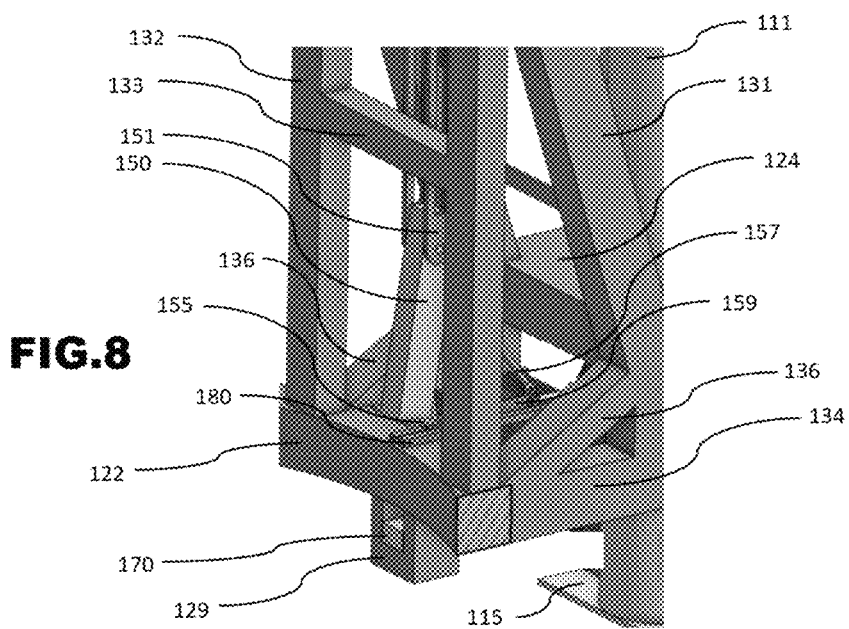
FIG. 8 shows the arm fully retracted.

When the arm 150 is fully raised, the actuator 159 can be activated to pull the bracket 158 back, as shown in FIG. 8. Upon reaching its fully retracted configuration, the arm 150 extends entirely with the strut 151 outside the cylindrical volume defined by the inner diameter of the interconnecting top structure 121.

The arms 170 are carried by a support 129 extending below the bottom interconnecting structure 122 and can move radially between a retracted configuration shown in FIG. 8 and an extended configuration shown in FIG. 9.

Each load transfer member 124 carries adjustable guides that bears on the rails 112 to transfer horizontal wind loads from the lifting frame to the legs 110.

Figure 10:
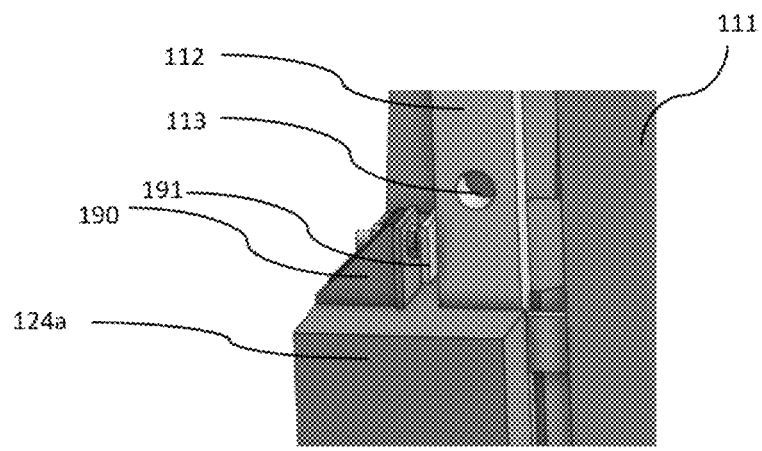
FIG. 10 shows an adjustable guide of a load transfer member.

The guides may comprise as shown in FIG. 10 a pad 191 that bears against the rail 112 and a screw mechanism to adjust the position of the pad 191 relative to a support 190 fixed to the load transfer member 124.

To operate the system 100, the lifting frame is raised on the legs 110 and a subsection of the tower is positioned below it. Then, the lifting frame is lowered and the gripping arms 150 or 170 are extended, according to the external diameter of the subsection.

The arms 150 or 170 are engaged in corresponding windows 13 of the subsection.

Figure 12:
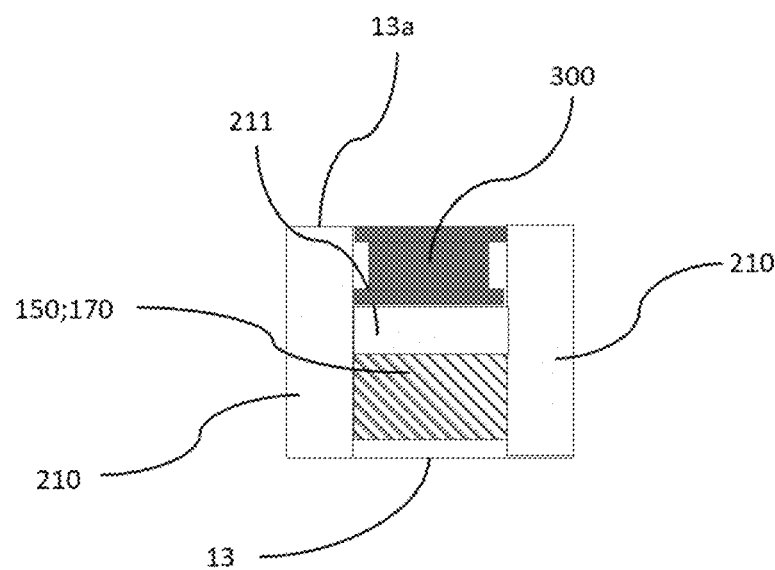
FIG. 12 is a schematic and partial section of a gripping arm engaged in a window of a subsection.

As shown in FIG. 12, each window 13 is provided with monodirectional (the direction being radial or along longitudinal axis of arm 150,170) sliding bearings 210 and 211 that avoids ovalization efforts to be applied by the arms to the subsection. An adjusting mechanism 300 such as a flat jack may be interposed vertically either between the upper face of the window 13 and the upper bearing 211 (as on FIG. 12) or reversely between the arm 150, 170 and the upper bearing 211, the upper bearing being in contact with the upper face of the window 13. This arrangement allows compensating for the play and to adjust precisely the verticality of the tower when gripped by the arms 150 or 170.

Then the self-climbing mechanisms 140 are actuated to raise the lifting frame and the subsection bearing on the gripping arms up to a height enabling the next subsection to be inserted below.

Once the next subsection has been positioned, the subsection carried by the lifting frame can be put on top thereof and can be assembled with it. The gripping arms can be retracted once the weight is supported by the bottom subsection.

Once the two subsections are assembled, the lifting frame can be lowered, and the gripping arms can be inserted in the windows of the bottom subsection for raising the succession of assembled subsections and prepare for the introduction of the next subsection.

This sequence is repeated until the last subsection is assembled.

During the operation of the system 100, the gripping arms 150 are used first for erecting the subsections of the tower having the smaller outside diameter and the arms 170 are used for raising the subsections of larger diameter.

Due to the rigidity of the lifting frame, there is surprisingly no need to immobilize the tower under assembly relative to the system using holding arms to apply horizontal loads on the tower. The tower under assembly is only maintained by the gripping arms without any other load being applied by the system to the tower.

There are also substantially no bending moments transferred to the legs 110 thanks to the rigidity of the lifting frame. Horizontal loads from the wind pressure can be efficiently transferred to the legs 110. The absence of elements bearing on the concrete of the raised subsection other than the arms 150 or 170 avoids the application of ovalization constraints to the concrete.

The legs 110 are easy to install or remove, enabling short mobilization/demobilization times.

Of course, various modifications can be brought to the system without departing from the scope of the invention. For example, changes may be brought to the braced frame structures and the way the arms are mounted thereon.

The invention claimed is:

1. A system for assembling a tower for a wind generator comprising a succession of subsections (Si), the system comprising:
    a plurality of lifting legs,
    a lifting structure vertically movable on the lifting legs, said lifting structure comprising a rigid lifting frame for holding the tower for a wind generator under assembly, said rigid lifting frame comprising load transfer members and said lifting structure comprising self-climbing mechanisms interacting between the load transfer members and the lifting legs for elevating or lowering the lifting structure,
    at least a first set of gripping arms movable relative to the rigid lifting frame between a retracted configuration and a gripping configuration,
the self-climbing mechanisms being situated below the load transfer member to push the load transfer member during lifting of the tower for a wind generator under assembly.

2. The system according to claim 1, the rigid lifting frame comprising a plurality of braced frame structures distributed around a central axis of the rigid lifting frame and each associated with a respective lifting leg, the braced frame structures being interconnected by top and bottom interconnecting structures.

3. The system according to claim 2, wherein each braced frame structure comprises at least one oblique beam extending obliquely with a distance to a central axis of the rigid lifting frame increasing going downwards from the top interconnecting structure to a corresponding load transfer member.

4. The system according to claim 3, wherein each braced frame structure comprises at least one vertical beam extending between said top and bottom interconnecting structures.

5. The system according to claim 2, wherein each braced frame structure comprises a diagonal brace extending from the load transfer member to the bottom interconnecting structure.

6. The system according to claim 2, wherein each braced frame structure is symmetrical about a mid-plane of symmetry containing the longitudinal axis of an adjacent lifting leg.

7. The system according to claim 1, wherein the self-climbing mechanisms for elevating or lowering the rigid lifting frame relative to the lifting legs each comprising a first stage and a second stage connected by at least one expendable structure.

8. The system of claim 7, the first and second stages being provided with releasable latches for selectively anchoring on the lifting legs.

9. The system according to claim 1, wherein each arm of the first set of gripping arms being articulated between a working position where the arm is substantially horizontal and bears against the bottom interconnecting structure and a retracted position, each arm being articulated close to a gripping end of the arm to a sustaining strut extending diagonally when the arm is in the working position between said arm and a fixed guiding element, said strut comprising a slide and said fixed guiding element engaging said slide so that when the arm is in the working position the guiding element is bearing against a stop of said slide to take a strain of the strut, said slide moving relative to the guiding element when the arm is moved toward its retracted position to allow pivoting of said arm.

10. The system according to claim 9, wherein the arm is articulated at a proximal end of the arm to a support mounted on the slide allowing to move the proximal end of the arm radially outwards once the arm has been raised.

11. The system according to claim 1, further comprising a second set of gripping arms different from the first set and configured for holding a subsection of the tower having an external diameter larger than an external diameter of the subsection the first gripping arms are capable of gripping.

12. The system according to claim 1, wherein the load transfer members each comprise at least one adjustable guide configured to engage a climbing rail of the corresponding lifting leg to transfer horizontal wind loads from the tower for a wind generator under assembly to the lifting leg.

13. The system according to claim 1, further comprising monodirectional sliding bearings at windows of the subsection of the tower for a wind generator under assembly in which the gripping arms can engage.

14. The system of claim 1, each load transfer member being substantially U-shaped, with the branches of the U extending on either side of the lifting leg.

15. A method for erecting a tower for a wind generator, comprising elevating subsection(s) (Si) of the tower for a wind generator under assembly with a system according to claim 1, comprising:
    a plurality of lifting legs,
    a lifting structure vertically movable on the lifting legs, said lifting structure comprising a rigid lifting frame for holding the tower for a wind generator under assembly, said rigid lifting frame comprising load transfer members to which lifting forces are applied for raising the lifting structure,
    at least a first set of gripping arms movable relative to the rigid lifting frame between a retracted configuration and a gripping configuration and configured for engaging a subsection of the tower, in which method a transfer of horizontal loads from the lifting structure or the tower to the lifting legs occurs only through the load transfer members.

16. A method for erecting a tower for a wind generator, comprising elevating subsection(s) of the tower for a wind generator under assembly with a system according to claim 1, the system comprising:
- a plurality of lifting legs,
- a lifting structure vertically movable on the lifting legs, said lifting structure comprising a rigid lifting frame for holding the tower for a wind generator under assembly, said rigid lifting frame comprising load transfer members and said lifting structure comprising self-climbing mechanisms interacting between the load transfer members and the lifting legs for elevating or lowering the lifting structure,
- at least a first set of gripping arms movable relative to the rigid lifting frame between a retracted configuration and a gripping configuration and configured for engaging a subsection of the tower, in which method:
- a lower end of the tower for a wind generator under assembly is elevated using the self-climbing mechanisms at a height sufficiently high in order to allow for inserting below the tower for a wind generator under assembly a next subsection to be assembled with raised subsection(s) of the tower,
- the lifting structure is lowered so that the lower end of the tower for a wind generator under assembly can be assembled to this subsection,
- the griping arms are disengaged from the tower for a wind generator under assembly,
- the lifting structure is lowered to enable the griping arms to engage the subsection situated at a bottom of the tower for a wind generator under assembly.

17. A system for assembling a tower for a wind generator comprising a succession of subsections (Si), the system comprising:
- a plurality of lifting legs, a lifting structure vertically movable on the lifting legs, said lifting structure comprising a rigid lifting frame for holding the tower for a wind generator under assembly, said rigid lifting frame comprising load transfer members and said lifting structure comprising self-climbing mechanisms interacting between the load transfer members and the lifting legs for elevating or lowering the lifting structure, at least a first set of gripping arms movable relative to the rigid lifting frame between a retracted configuration and a gripping configuration, the rigid lifting frame comprising a plurality of braced frame structures distributed around a central axis of the rigid lifting frame and each associated with a respective lifting leg, the braced frame structures being interconnected by top and bottom interconnecting structures, wherein each braced frame structure comprises two oblique beams extending obliquely with a distance to a central axis of the rigid lifting frame increasing going downwards from the top interconnecting structure to a load transfer member extending at least partially close to an adjacent lifting leg, two vertical beams extending between said top and bottom interconnecting structures, two horizontal beams extending from the bottom interconnecting structure to a vertical connecting member, said vertical connecting member extending vertically from a junction of the oblique beam and the load transfer member, and at least one brace member connecting the two vertical beams and/or the two oblique beams.

* * * * *